UNITED STATES PATENT OFFICE.

FILIPPO ARTIMINI, OF FLORENCE, ITALY.

COMPOUND FOR PRESERVING MEAT.

SPECIFICATION forming part of Letters Patent No. 228,016, dated May 25, 1880.

Application filed December 10, 1879. Patented in England June 26, 1879.

*To all whom it may concern:*

Be it known that I, FILIPPO ARTIMINI, of Florence, Italy, professor of chemistry, have invented an Improved Antiseptic Compound for the Preservation of Meat, &c.; and I do hereby declare that the following description forms a full and exact specification of the same, wherein I have set forth the nature and principles of my said improvement, by which my invention may be distinguished from others of a similar class, together with such parts as I claim and desire to secure by Letters Patent— that is to say:

My invention relates to the preservation of meat and other articles of food by the use of a special antiseptic material prepared and applied as will now be described.

Water, preferably purified by distillation, is rendered aromatic by immersion therein of nutmeg broken into small fragments. The quantity of nutmeg may be varied; but practically the addition of from one to two parts of nutmeg to one thousand parts of water is sufficient to aromatize the water to the extent required. With the water thus aromatized is formed a solution of boric tartrate, a compound of boracic and tartaric acids, both of which, for the purposes of this invention, should be used chemically pure.

The tartaric acid employed may be that of commerce purified by repeated crystallization, and the boracic or "boric acid," as it is sometimes called, should be purified by means of hydrochloric acid. The two acids, properly purified, are combined by heat in the proportion of two parts of the tartaric acid to fifteen parts of the boric acid, producing a compound (somewhat deliquescent) salt, herein termed "boric tartrate." A solution of this salt in the aromatized water, in the proportion of from twelve to fifteen parts to one thousand parts of the water, constitutes the liquid antiseptic, which is applied as follows: When the meat is to be preserved in large pieces, each exceeding, for example, ten pounds in weight, the antiseptic liquid is injected into an artery of the animal by means of a small pump, which, with its connecting-pipes and valves, should be internally gilt or otherwise protected from the chemical action of the liquid. After injection the animal is cut up into pieces, which, after the bones are removed, are immersed in the antiseptic liquid for several hours. The pieces are then dried in a current of air. When it is desired to preserve smaller pieces, each not exceeding five or six pounds in weight, the injection may be dispensed with, the pieces, without bone, being in that case simply immersed for several hours in the antiseptic liquid, and then dried in the air.

Meat treated as above described will retain its freshness for several months. It may, moreover, be dried and preserved for longer periods as a material for soup or broth.

The antiseptic liquid is applicable for the temporary preservation of pieces of meat in the market or stall by brushing them over with a sponge or cloth soaked in the antiseptic liquid, whereby they are made to retain their freshness for several days.

Fish, poultry, butter, and other organic substances used for food may in like manner be preserved by moistening their surfaces with the antiseptic liquid.

Although I have stated certain proportions which I find best for the production and application of the antiseptic solution, these proportions may be somewhat varied, according to the masses of meat dealt with and temperature or other external conditions under which they are treated.

I am aware that boracic acid and also tartaric acid have each been used in preserving meats, &c., and such I do not claim.

Having thus described the nature of my invention, and the best means I know of carrying it out in practice, I claim—

As a new article of manufacture, the antiseptic herein termed "boric tartrate," prepared as herein described.

In testimony whereof I have signed my name to this specification, in the presence of two subscribing witnesses, this 23d day of November, A. D. 1879.

FILIPPO ARTIMINI.

Witnesses:
D. EDUARDO VENTZIETTI,
SPIRITO BERNANDI.